UNITED STATES PATENT OFFICE.

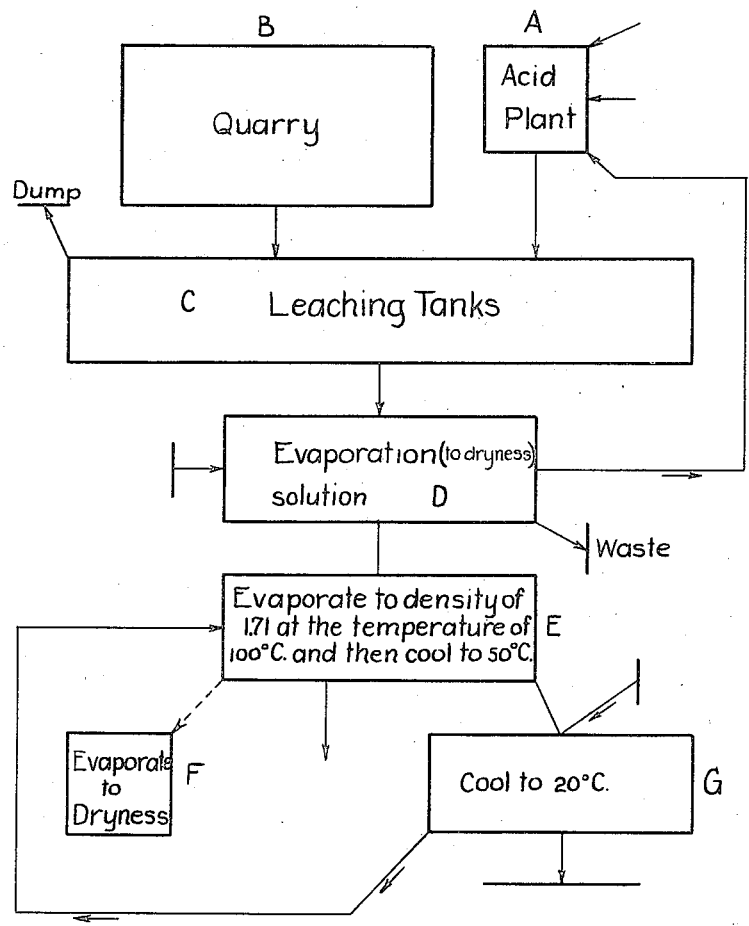

FREDERIC LUDWIG FIREBAUGH, OF BERKELEY, CALIFORNIA.

PROCESS FOR TREATING ROCK CONTAINING ALKALI METALS.

1,182,668. Specification of Letters Patent. Patented May 9, 1916.

Application filed April 30, 1915. Serial No. 24,882.

*To all whom it may concern:*

Be it known that I, FREDERIC L. FIREBAUGH, a citizen of the United States, and a resident of Berkeley, in the county of Alameda and State of California, have invented a new and Improved Process for Treating Rock Containing Alkali Metals, of which the following is a full, clear, and exact description.

My invention relates to a process of treating rock containing alkali metals, and more particularly rock rich in potassium.

The object of the invention is the provision of a simple and economical process for converting the alkali contained in the rock into soluble sulfates, and then separating the potassium salt from the sodium salt generally present therewith.

The accompanying drawing locates diagrammatically the successive operations performed on the rock.

The process outlined utilizes sulfuric acid as a leaching agent. The alkali sulfates resulting are separated from the impurities by alternate evaporation and cooling. The sulfuric acid utilized as a leaching agent is produced on the ground, as indicated by A on the drawing, by roasting sulfids or sulfur and treating the fumes by the lead-chamber process. The leucite rocks are brought from the quarry B and discharged into the leaching vats C, and then a proper amount of acid is added to react with the contained rocks, such as Nephelin, $K_2Na_6Al_8Si_9O_{34}$.
Nozelite, $Na_3Al_3(SO_4)(SiO_3)$.
Leucite, $KAl(SiO_3)_2$.

Sufficient time is allowed to complete the solution of the soluble minerals.

$K_2Na_6Al_8Si_9O_{34} + 16H_2SO_4 + 80H_2O \rightarrow K_2SO_4.Al_2(SO_4)_3.24H_2O + 3Na_2SO_4.Al_2(SO_4)_3.24H_2O + 9SiO_2$.
$2KAl(SiO_3)_2 + 4H_2SO_4 + 20H_2O \rightarrow K_2SO_4.Al_2(SO_4)_3.24H_2O + 4SiO_2$.
$2Na_3Al_3(SO_4)(SiO_3) + 12H_2SO_4 + 10H_2O \rightarrow 3Na_2SO_4.Al_2(SO_4)_3.24H_2O + 6SiO_2$.

The liquor is then drawn off to D. Some of the iron present may be dissolved along with the potassium and sodium-alumino-silicates. The drawn-off liquor is evaporated to dryness in a suitable vessel, preferably lead lined, and maintained at a temperature of 100 degrees centigrade until dry and then heated until all of the aluminum and iron sulfates are decomposed.

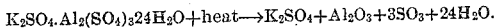

The sulfur tri-oxid and water liberated are reconveyed into the acid plant, where they are recondensed so that only that amount of acid is consumed which enters into combination with the soda and potash. After heating the evaporated solution, as stated, sufficient water is added to the hot mass to dissolve all of the potassium sulfate. The sodium present will be dissolved at the same time.

The quantity of water required is dependent upon the content of potassium sulfate; and unless it is less than one-half of the content of sodium sulfate, the amount of water required may be expressed in terms of the potassium sulfate. That is to say $N=KW$. Where N is the number of gallons to be used, $K=1117.5$, and W is the weight in tons of the potassium sulfate to be dissolved. The resultant solution is drawn from D to E, whereby a residue of alumina and ferric oxid remains. The solution at E is concentrated by evaporation, at a temperature of about 100 degrees C., to a density of 1.71, and then it is allowed to cool to about 50 degrees C. to insure the separation by crystallization of as much potassium sulfate as possible without the crystallization of the sodium sulfate, the cooling being done by any suitable means. At the end of the cooling the content of the potassium sulfate is one-half that of the sodium.

If for any reason it is not convenient to separate the alkali salts more thoroughly, the solution in E may be evaporated to dryness at F immediately, but the proper way is to separate them by conveying the solution from E into G, which is a cooling vat. Enough water is added to the solution to keep all the potash in solution as the temperature is lowered. As seen from above, the amount of sodium sulfate present determines the amount of potassium sulfate contained in the solution; therefore it is proportionate to the amount of water to be added and may be expressed as follows:

$$N' = K' \times W',$$

where $N'$ is the gallons in water to be added; $K'$, 182.13; and $W'$, the weight in tons of sodium sulfate.

From the above it will be seen that the operation consists of an infinite repetition of heating, cooling, watering, cooling, watering and heating, and so over again.

| A. | B. | C. | D. | E. | A. |
|---|---|---|---|---|---|
| Evaporation 100° C. | 50° C. | Watering. | 20° C. | Watering. | |
| ($Na_2SO_4$) | ($Na_2SO_4$) | | ($K_2SO_4$) | | |
| $K_2SO_4$ | $K_2SO_4$ | | $Na_2SO_4$ | $10H_2O$ | |
| ↓ | ↓ | | ↓ | | |

(All of the above inclosed in parentheses remains in solution; all marked with the arrow precipitates.)

Since the various stages are repeated for each portion of solution in a mixture with all of the other solution-portions, it becomes necessary to determine the amount of water required to maintain all the salt from each and every successive portion in solution. At the end of the infinite repetition the amount becomes zero in both cases, so that the term K refers to the number of gallons of water required per ton of soluble potassium sulfate in the original residue, and is the sum of the infinite series of gradually decreasing amounts required to keep all the potassium sulfate portions, in the various cycles of repetition, in solution. The $K'$ gallons added in E is required for each ton of sodium sulfate or Glauber's salt in the original solution. By adding this certain amount of water all of the residual portions in various cycles of repetition in the separation are maintained in solution.

If the estimation is made for Glauber's salt, the coefficient $K'$ should be 128.02. The temperature in the cooling vat G is reduced to about 20 degrees C. When all of the sodium sulfate separates from the solution that will, the density thereof reaches 1.38, which solution is then returned to the evaporating vat E, and the process is repeated.

From the above description it will be seen that in my process of treating rock containing alkali metals the sulfur trioxid, resulting from the decomposition of the mass obtained by leaching the rocks, is recondensed and utilized again for the further treatment of the rocks. The separation of the potassium and sodium salts are obtained by crystallization, and the remaining solution, which contains the potassium salt, is returned to be enriched as described, all of which results in a simple and economical process.

I claim:

1. The process of treating rock containing sodium and potassium which consists in leaching the rock with sulfuric acid, evaporating the resulting solution to dryness, continuing to heat the evaporated mass to decompose the non-alkali sulfates, adding water to the so-heated mass to dissolve the sodium and potassium sulfates, then concentrating the so-formed solution of sodium and potassium sulfates by evaporation, then cooling the concentrated solution to separate by crystallization the maximum amount of potassium sulfate from the sodium sulfate, then adding to the remaining solution more water and cooling the same, so that the sodium sulfate can be separated by crystallization without crystallizing the potassium sulfate present.

2. The process of treating rock containing sodium and potassium which consists in leaching the rock with sulfuric acid, evaporating the resulting solution to dryness, continuing to heat the evaporated mass to decompose the non-alkali sulfates present, adding water to the so-heated mass to dissolve the sodium and potassium sulfates, concentrating the so-formed solution of sulfates by evaporation, then cooling the concentrated solution to a temperature of about 50 degrees centigrade to separate by crystallization the maximum amount of potassium sulfate from the solution, then adding to the remaining solution more water and cooling the same to a temperature of 20 degrees centigrade so that the sodium sulfate can be separated by crystallization without crystallizing the potassium sulfate present, returning the remaining solution to a new solution of potassium and sodium sulfate before it is concentrated.

In testimony whereof I have signed my name to this specification in the presence of two subscribing witnesses.

FREDERIC LUDWIG FIREBAUGH.

Witnesses:
WILLIAM HENRY BARKER,
MARSHALL P. W. ALBEE.